June 2, 1959　　K. KARWOWSKA　　2,888,703
EYEGLASS WIPER
Filed Aug. 14, 1956
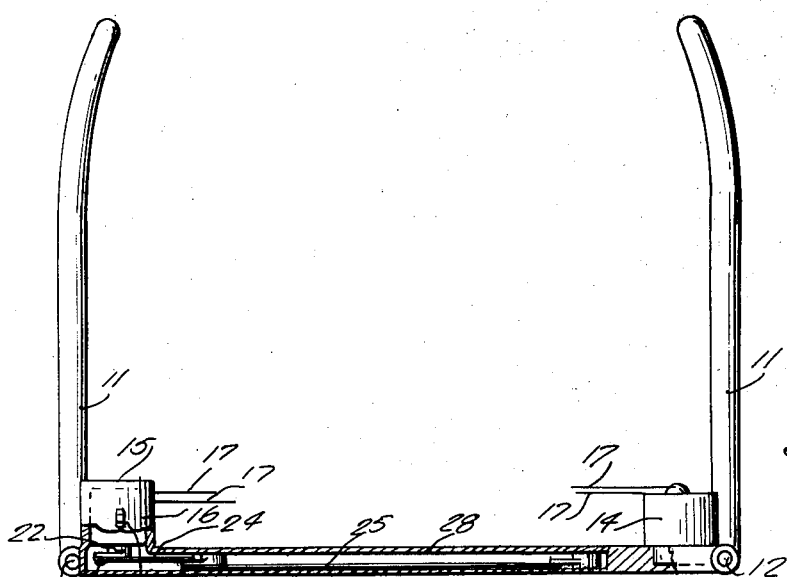
Fig.1
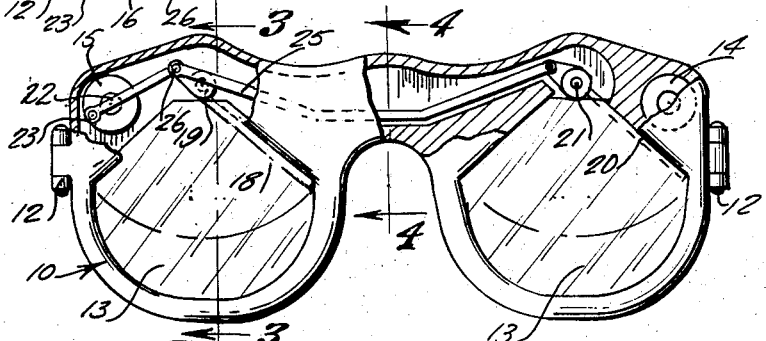
Fig.2
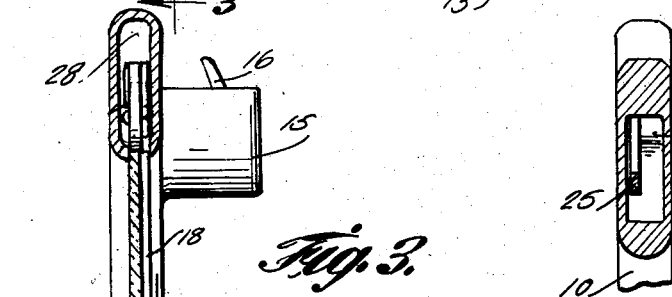
Fig.3
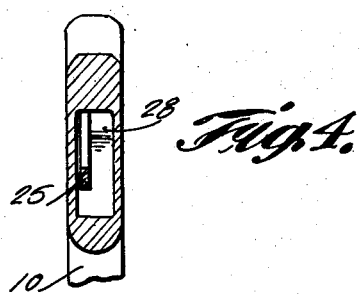
Fig.4
INVENTOR.
*Klara Karwowska*
BY 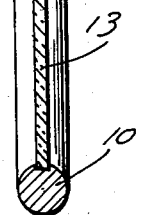
ATTORNEYS

2,888,703

EYEGLASS WIPER

Klara Karwowska, Calgary, Alberta, Canada

Application August 14, 1956, Serial No. 603,912

1 Claim. (Cl. 15—253)

This invention relates to eyeglasses, more particularly to wipers for eyeglasses.

The object of the invention is to provide an eyeglass wiper mechanism which will effectively keep eyeglasses clean of rain, steam, or the like.

Another object of the invention is to provide a pair of eyeglasses which are provided with a means for keeping the lenses free or clean so that even when it is raining, snowing or the like, the person wearing the glasses will be able to readily actuate the wipers so as to keep the lenses clean for clear visibility.

A further object of the invention is to provide eyeglass wipers which are extremely simple and inexpensive to manufacture.

Other objects and advantages will be apparent during the course of the following description.

In the accompanying drawings, forming part of this application and in which like numerals are used to designate like parts throughout the same:

Figure 1 is a top plan view of the eyeglasses provided with the wiper of the present invention, and with parts broken away and in section.

Figure 2 is a front elevational view of the eyeglasses with the wiper therein, and with parts broken away and in section.

Figure 3 is a sectional view taken on the line 3—3 of Figure 2.

Figure 4 is a sectional view taken on the line 4—4 of Figure 2.

Referring in detail to the drawings, the numeral 10 designates the eyeglass frame which can be made of any suitable material, and a pair of temples or side pieces 11 are hingedly connected to the ends of the frame 10 through the medium of hinge pins 12. Mounted in the frame 10 is a pair of lenses 13.

The present invention is directed to a wiper means for maintaining the lenses 13 clean or clear of steam, rain, snow, or other foreign matter, and the wiper mechanism of the present invention includes a source of electrical energy such as the battery 14 which may be secured to the frame 10 in any suitable manner.

Also carried by the frame 10 is an electric motor 15 which may be provided with a manually operable switch or control button 16 whereby upon actuation of the switch 16, the motor 15 can be energized. The electric wire 17 may lead from the motor 15 to the battery 14.

There is further provided a pair of moveable wiper blades 18 and 20. The blade 18 may be pivotally connected to a portion of the frame 10 through the medium of a pivot pin 19, while the blade 20 may be pivotally connected to a portion of the frame 10 through the medium of a pivot pin 21. A shaft 22 may be rotated by the motor 15, and the shaft 22 rotates an eccentric 23 which has one end of a link 24 connected thereto.

The other end of the link 24 is pivotally connected to a cross piece or body member 25 through the medium of a pivot pin 26. The cross piece 25 is also connected to the blade 20 through the medium of a pivot pin 27. The frame 10 may be provided with a cutout or recess 28 so as to provide clearance for the various moving links or connecting members.

From the foregoing, it is apparent that there has been provided a wiper mechanism for eyeglasses whereby the eyeglass lenses 13 will be kept free of rain, snow, or other foreign matter. Thus, the user or wearer will be able to have a clear vision through the lenses 13 at all times, even during bad weather conditions. In use, the battery 14 and motor 15 may be very tiny or small and these members together with the connecting links are carried by the frame 10. The wire 17 leads from the battery 14 to the motor 15. Then, when it is desired to clean the lenses 13, it is only necessary to actuate the switch 16 and this will cause the rotation of the shaft 22 which in turn causes movement of the eccentric pin 23. This in turn causes movement of the link 24 and this movement of the link 24 causes the pair of wiper blades 18 and 20 to oscillate across the pair of lenses 13. Thus, the lenses 13 will be kept clean of all foreign matter so that the wearer or user will have clear vision. After the lenses 13 have been properly cleaned, the switch 16 can be used to turn off the motor 15 and when the blades 18 and 20 are not being used, they are in an out-of-the-way position as shown in Figure 2 so that there will be no interference with normal vision through the lenses 13.

The parts can be made of any suitable material and in any desired shape and size. The blades may be shaped to conform to the configuration of the lenses. Any type of battery can be used as desired. The blades may either be made to wipe the inner surface or the outer surface of the lenses.

What is claimed is:

In combination, a pair of eyeglasses embodying a frame provided with a pair of lenses therein, wiper means for maintaining said lenses clean, said wiper means including first and second blades mounted for swinging movement across the surface of the lenses, pins pivotally connecting said blades to said frame, a cylindrical motor positioned contiguous to said frame, said motor being arranged adjacent one end of the frame and positioned rearwardly of the frame, a cylindrical battery carried by said frame and electrically connected to said motor, said battery being arranged adjacent the opposite end of the frame from the motor and said battery being arranged rearwardly of the frame, connecting means connecting said motor to said pair of blades, said last named means comprising a shaft driven by said motor, an eccentric connected to said shaft, a first link connected to said eccentric, said first link being connected to one of said wiper blades, a cross piece connecting said first and second blades together, said blades being shaped to conform to the configuration of the lenses, there being recesses in said frame for receiving said connecting means so as to provide clearance for the various moving parts and connecting members, said recesses being arranged in the upper portion of the frame, said recesses including an elongated portion which extends across the top section of the frame and through which extends the crosspiece, a manually operable switch for controlling actuation of said motor, and whereby when the blades are not being used, they are in an out-of-the-way position so that there will be no interference with normal vision through the lenses.

References Cited in the file of this patent

UNITED STATES PATENTS

| | | |
|---|---|---|
| 1,806,336 | Critchfield | May 19, 1931 |
| 2,264,242 | Horton | Nov. 25, 1941 |

FOREIGN PATENTS

| | | |
|---|---|---|
| 413,447 | Great Britain | July 19, 1934 |
| 575,868 | Germany | May 4, 1933 |
| 708,760 | France | May 5, 1931 |
| 795,771 | France | Jan. 13, 1936 |